Patented Sept. 26, 1944

2,358,869

UNITED STATES PATENT OFFICE 2,358,869

PROCESS OF FRACTIONATING AND REFINING ORGAN EXTRACTS

Siegfried Maurer and Harold Oliver Wiles,
Chicago, Ill.

No Drawing. Application July 19, 1941,
Serial No. 403,234

7 Claims. (Cl. 167—74)

This invention relates to the recovery of extracts from animal organs. More particularly, it pertains to a suitable process of fractionating and refining extracts obtained from the treatment of mammalian liver and includes correlated improvements and discoveries whereby the process and results are enhanced.

This invention is a continuation in part of our other application filed October 27, 1938, and bearing Serial No. 237,318, now Patent No. 2,275,784.

Animal tissues, such as mammalian liver, contain substances which alter the solubilities of certain other constituents after they have been subjected to an aqueous treatment thus interfering with their removal by solvent extraction. In fact, there are various constituents which influence the behavior of the other substances. It is recognized that a group of substances, which includes the phosphatides, act as solvents or dispersing agents for fats and other lipids when in aqueous suspensions. If liver tissue, for example, is extracted with water, the extract will contain lipid constituents not normally soluble in water but held in suspension by phosphatides or proteins or both. If this aqueous extract is extracted with an immiscible solvent, a larger portion of the fats and other lipids, including sterols, will pass into the extractant phase. The phosphatides, although soluble per se in most fat solvents, are incompletely extracted from such an aqueous phase as above set forth. These phosphatides, because of their fat solubility, hold a certain amount of additional lipids in the aqueous phase.

Whether a dry organ substance or suitably dried aqueous extract is extracted with fat solvent the lipid dispersing agents, except perhaps a substantial amount of proteins, are extracted with the fats and other lipids. If no aqueous phase is present it is possible to use water-miscible solvents to remove other materials such as, for example, bile salts and other offensive substances by the solvent action of a suitable alcohol, such as ethanol.

Much of the disagreeable odor and taste of crude liver extract is due to the lipids and bile constituents. This taste becomes more pronounced and offensive after the material has been heated or even when left standing in air. Crude liver solvent extracts containing such lipids and bile constituents are dark in color and, of course, are characterized by the accompanying disagreeable odors and tastes.

It is, therefore, necessary and desirable if these extractions are to be complete that the organ substance be substantially dry, i. e., existing as or having been converted by grinding or other suitable means to discrete powder. It is not convenient to set any exact limit of moisture content since the amount of glucose present, the humidity of the air and the physical nature of the solid material may all influence the point at which the powder may tend to agglomerate into masses.

Ordinarily, in preparing fresh mammalian livers for extraction they are first subjected to a freezing operation for the purpose of rupturing the cell walls. Thereafter the liver material is finely mixed or ground and further subjected to an extraction process by suitable solvents. It has been conventional to prepare such materials in powder form by a process of dehydration or drying of an aqueous solution. For example, such a powder may be prepared by drying it at ordinary pressure with or without heating; it may be dried at reduced pressure with or without heating; or, it may also be dried by means of dehydrating agents such as desiccant salts or hydrophilic liquids, such as acetone, ethyl alcohol or propyl alcohol.

Under these circumstances, evaporation takes place if unsaturated air or other gas is passed over the surface of the liquid, or the liquid is kept at its boiling point at the existing pressure and the vapor stage is allowed to expand as in ordinary cases of boiling or distillation. In either case heat must be applied as fast as it is removed by evaporation. The time required for evaporation of a given amount of water is determined by the rate of heat transfer and by the rate of removal of saturated vapor from the surface.

Such process is accompanied by many disadvantages. Air drying at room temperature is not feasible because of the time and size of the physical plant required. Drying the material at elevated temperatures and atmospheric pressure shortens the time but ordinarily increases tremendously the damage done to the animal tissue constituents by oxidation, denaturation, pyrolysis, catalyzed reactions, etc.

The conventional practice is to dry at moderate temperature and reduced pressure, but this also has certain undesirable features. That method is a so-called batch method in which all the material to be concentrated is exposed to the adverse effect of heat for the full time of evaporation, the layer or film next to the heated surface circulates slowly and is exposed to higher temperatures than the bulk of the liquid and as the concentration of the solution is increased by the evaporation, the vapor tension of the water is lowered and the rate of evaporation is correspondingly slow. Ultimately it becomes almost impossible to remove the last of the water without using prohibitive temperatures and negative pressures.

In accordance with the principles of the present invention the destructive effect of high temperature is substantially eliminated by a short drying time. We have observed that if the physical conditions are adjusted to provide a large evaporating surface and a rapid removal of vapor, the operating time can be significantly reduced. Preferably, we utilize a drying method in which the aqueous solution is projected in a fine spray into a moving column of warm unsaturated air. By this method water evaporates from the surface of the droplets, heat equivalent to the heat of evaporation is absorbed from the air and the air temperature drops. The droplets continue to fall through a current of unsaturated air until substantially all the water is removed and the dried particles fall to the floor of the chamber in which the operation is being conducted. By actual experience we have obtained results which show that liver solutions can best be dried by this technique with essentially no damage to the liver constituents in that there is no oxidating or thermal damage which brings about the unpalatable taste and objectionable odors to such extracts, the color is very light and clear and the riboflavin (vitamin $B_2$) content is not diminished, at least within experimental methods of determination. In this respect, the fact that the riboflavin content is not diminished serves as a fairly sensitive indicator that no oxidation or thermal damage has occurred.

It is, therefore, an object generally of the present invention to overcome the difficulties and disadvantages hereinbefore set forth and to provide a process which will uniformly and efficiently fractionate and refine mammalian liver extracts and which will be simple and economical in its operation in producing the desired results.

A principal object of the invention is the provision of a process which prevents the effects of the drastic treatment normally causing darkening of the resulting products because of oxidation or thermal damage to many of the combining constituents and which will substantially eliminate the disagreeable and unpalatable taste and odors from the resulting products.

Specific objects of the invention are the provision of a process which will successively provide lipid extracts, vitamins A and K and an anti-menorrhagic factor; a dry soluble liver extract; a lipid-free liver powder; a lipid extract containing phospholipids and fats free from bile salts; an iron protein complex residue; and a suitable nitrogenous fraction (parenteral primary anemia factor) all substantially free from oxidative or thermal damage.

Other objects of the invention will in part be obvious and will in part appear hereinafter.

The invention accordingly comprises the several steps and the relation and order of one or more of such steps with respect to each of the others thereof, which will be exemplified in the process hereinafter disclosed, and the scope of the application of which will be indicated in the claims.

Referring more specifically to the process involving the present invention, mammalian livers are finely ground or macerated and mixed with about three volumes of water. The resulting mixture is extracted with an immiscible lipid solvent such as, for example, chloroform, ethylene dichloride, ligroin, or toluene. The solvent extract may be removed by decantation and this contains most of the lipids, vitamins A and K and the anti-menorrhagic factor. The aqueous mixture is heated to about 75° to 80° C. and is stirred while being heated to coagulate part of the protein. During the heating period and the stirring operation, the liver enzymes are inactivated. The coagulum is drained or pressed and the remaining heat-coagulable material and liver connective tissue may be discarded. The resulting filtrate which contains the water-soluble constituents plus some phosphatides and other lipids is dried to a powder under such conditions of time, temperature and pressure that there is substantially no thermal or oxidative damage to the constituent materials. Preferably, the filtrate is dried by a carefully controlled spray drying method. The temperature of drying and the water content of the resultant powder will vary with the concentration of the solution and the inherently variable qualitative composition of the original livers.

The powder in dry mass form contains all the water-soluble, nonheat-coagulable material of the liver and also still contains some fats and phospholipids. These are next removed by extraction with ethylene dichloride or other suitable lipid solvent.

As an alternative of the foregoing method for removing lipids and substances of similar solubility, the solvent extraction may be performed after the coagulum is removed from the aqueous solution by filtration. By way of example, livers are ground and mixed with water. The mixture is heated and stirred to coagulate part of the proteins. The coagulum is drained or pressed and the residue, i. e., the coagulum and connective tissue, either moist or dry, is extracted with a suitable lipid solvent by shaking, stirring or otherwise agitating the solids with a solvent which is recovered by draining or pressing. The remaining coagulum may be discarded. The resulting extract, after removal of the solvent, contains most of the lipids, vitamins A and K and the anti-menorrhagic factors. The aqueous filtrate is suitably dried and the powdered liver substance is also extracted with a lipid solvent to recover residual fat, vitamins A and K and phospholipids.

The foregoing alternative method has certain advantages in that it avoids the difficult extraction of a liquid solid mixture with the accompanying tendency to emulsification and extraction of the coagulum and of the dried powder involves the handling of relatively small volumes of material and mechanically is more simple.

The bile salts and other offensive and unpalatable materials which are also present may be removed at this point by extraction with ethyl alcohol of preferably 95 per cent strength or of even higher concentration.

The dry liver powder resulting from these steps may then be used as such or it may be dissolved in water or may be divided into several chemical fractions. It still contains some insoluble residue. A convenient further fractionation may be accomplished as follows:

The dry material is preferably extracted with warm alcohol 70 per cent by volume. This alcohol is preferably not over 50° C. A second extraction similarly performed is preferred and the extracts of this dual operation may then be combined. Most of the protein is left in the insoluble residue, designated by B, while the peptones, nitrogenous extractives, most of the glucose and part of the vitamins are taken into the solution, designated by A, which still contains some of the protein. The alcohol may be removed by distillation in vacuo below 50° C. but again is preferably removed by the above described spray evaporation method which, by removing most of the alcohol and part of the water, yields a more concentrated aqueous solution. This may be used as such or may be fractionated further. The aqueous solution, if it is desired to fractionate further, may be taken up in water and extracted with liquefied phenol. The aqueous phase contains the glucose and inorganic salts. The phenolic phase contains the protein peptones, nitrogenous extractives and some of the water-soluble vitamins. The nitrogenous material may be recovered from the phenol by the addition of three or more volumes of acetone or strong ethyl or propyl alcohol, the material precipitating either as a flocculate or gummy mass. More specifically, the phenolic phase may be treated with three volumes of acetone and let stand to permit complete precipitation of the protein and peptone from the phenol-acetone solution. The phenol-acetone mixture is decanted and the residue again washed with acetone, thus removing much residual phenol. The precipitate, however, may be taken up in 70 per cent alcohol and cooled to give a solution of peptones and a protein residue which latter is separated therefrom. The resulting solution containing the peptones, etc., may be evaporated to a paste and taken up with 90 per cent ethyl alcohol and cooled, and a further "protein" residue separated therefrom. The resulting solution of primary factor is evaporated to remove alcohol and taken up in water to obtain the parenteral primary factor.

The material designated B above, which is insoluble in the 70 per cent alcohol solution and which is largely protein above mentioned, may also be fractionated further. This material may be taken up in water solution or suspension of about 20 to 25 per cent strength. An aqueous solution of ferric chloride or other ferric iron salt is then added until no more will combine with the protein as evidenced by a positive test for ferric iron with an external indicator. The iron protein complex may then be filtered off and dried and is ready for use.

It will thus be seen that the objects hereinbefore set forth may be readily and efficiently attained, and since certain changes may be made in carrying out the above process without departing from the scope of the invention it is intended that all matter contained in the above description shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

Having described our invention, what we claim as new and desire to secure by Letters Patent is:

1. The process of fractionating and refining organ extracts, comprising in combination, macerating fresh mammalian livers with water, extracting the resulting mixture with an immiscible lipid solvent, removing the solvent extract to recover a substantial portion of lipids, vitamins and anti-menorrhagic factor, heating the resulting aqueous mixture to produce a coagulum, separating from the coagulum a filtrate containing water-soluble constituents and remaining phosphatides and other lipids, and spray-drying said filtrate to powder form.

2. The process of fractionating and refining organ extracts, comprising in combination, macerating fresh mammalian livers with water, extracting the resulting mixture with an immiscible lipid solvent, removing the solvent extract to recover a substantial portion of lipids, vitamins and anti-menorrhagic factor, heating the resulting aqueous mixture to produce a coagulum, separating from the coagulum a filtrate containing water-soluble constituents and remaining phosphatides and other lipids, spray-drying said filtrate to powder form, and subjecting the powder to extraction with a lipid solvent to remove any remaining fats and phospholipids.

3. The process of fractionating and refining organ extracts, comprising in combination, macerating fresh mammalian livers with water, extracting the resulting mixture with an immiscible lipid solvent, removing the solvent extract to recover a substantial portion of lipids, vitamins and anti-menorrhagic factor, heating the resulting aqueous mixture to produce a coagulum, separating from the coagulum a filtrate containing water-soluble constituents and remaining phosphatides and other lipids, spray-drying said filtrate to powder form, subjecting the powder to extraction with a lipid solvent to remove any remaining fats and phospholipids, extracting the remaining substance with 95 to 100% alcohol to remove bile salts and other offensive materials, removing any residual solvent by evaporation to recover a dry lipid-free liver powder, further extracting said powder with aqueous-alcohol to yield a solution containing nitrogenous and other materials, and evaporating said solution to remove the alcohol to produce a remaining aqueous solution.

4. The process of fractionating and refining organ extracts, comprising in combination, macerating fresh mammalian livers with water, extracting the resulting mixture with an immiscible lipid solvent, removing the solvent extract to recover a substantial portion of lipids, vitamins and anti-menorrhagic factor, heating the resulting aqueous mixture to produce a coagulum, separating from the coagulum a filtrate containing water-soluble constituents and remaining phosphatides and other lipids, spray-drying said filtrate to powder form, subjecting the powder to extraction with a lipid solvent to remove any remaining fats and phospholipids, extracting the remaining substance with 95 to 100% alcohol to remove bile salts and other offensive materials, removing any residual solvent by evaporation to recover a dry lipid-free liver powder, further extracting said powder with aqueous-alcohol to yield a solution containing nitrogenous and other materials, evaporating said solution to remove the alcohol to produce a remaining aqueous solution, further extracting said aqueous solution with phenol to remove said nitrogenous material, and precipitating said nitrogenous material with acetone.

5. The process of fractionating and refining organ extracts, comprising in combination, macerating fresh mammalian livers with water, extracting the resulting mixture with an immiscible lipid solvent, removing the solvent extract to recover a substantial portion of lipids, vitamins and antimenorrhagic factor, heating the resulting aqueous mixture to produce a coagulum, separating from the coagulum a filtrate containing water-soluble constituents and remaining phosphatides and other lipids, spray-drying said filtrate to powder form, subjecting the powder to extraction with a lipid solvent to remove any remaining fats and phospholipids, extracting the remaining substance with 95 to 100% alcohol to remove bile salts and other offensive materials, removing any residual solvent by evaporation to recover a dry lipid-free liver powder, further extracting said liver powder with aqueous alcohol to obtain an insoluble protein residue, further fractionating said insoluble protein residue by treatment with a suitable iron salt, and recovering the resulting iron-protein complex.

6. The process of fractionating and refining organ extracts, comprising in combination, macerating fresh mammalian livers with water, extracting the resulting mixture with an immiscible lipid solvent, removing the solvent extract to recover a substantial portion of lipids, vitamins and antimenorrhagic factor, heating the resulting aqueous mixture to produce a coagulum, separating from the coagulum a filtrate containing water-soluble constituents and remaining phosphatides and other lipids, spray-drying said filtrate to powder form, subjecting the powder to extraction with a lipid solvent to remove any remaining fats and phospholipids, and extracting the remaining substance with 95 to 100% alcohol to remove bile salts and other offensive materials.

7. The process of fractionating and refining organ extracts, comprising in combination, macerating fresh mammalian livers with water, extracting the resulting mixture with an immiscible lipid solvent, removing the solvent extract to recover a substantial portion of lipids, vitamins and anti-menorrhagic factor, heating the resulting aqueous mixture to produce a coagulum, separating from the coagulum a filtrate containing water-soluble constituents and remaining phosphatides and other lipids, spray-drying said filtrate to powder form, subjecting the powder to extraction with a lipid solvent to remove any remaining fats and phospholipids, extracting the remaining substance with 95 to 100% alcohol to remove bile salts and other offensive materials, removing any residual solvent by evaporation to recover a dry lipid-free liver powder, and further extracting said liver powder with aqueous alcohol to obtain an insoluble protein residue.

SIEGFRIED MAURER.
HAROLD OLIVER WILES.